United States Patent [19]

Neuhaus et al.

[11] Patent Number: 5,296,181

[45] Date of Patent: Mar. 22, 1994

[54] PROCESS FOR THE PRODUCTION OF COMPOSITE BODIES HAVING ENHANCED BONDING BETWEEN LAYERS OF THE COMPOSITE BODIES THUS OBTAINED

[75] Inventors: Alfred Neuhaus; Bruno Luckas; Gézar Avar, all of Leverkusen, Fed. Rep. of Germany

[73] Assignee: Bayer Aktiengesellschaft, Leverkusen, Fed. Rep. of Germany

[21] Appl. No.: 943,251

[22] Filed: Sep. 10, 1992

[30] Foreign Application Priority Data

Sep. 19, 1991 [DE] Fed. Rep. of Germany ....... 4131203

[51] Int. Cl.$^5$ .............................................. B29C 67/22
[52] U.S. Cl. .................................. 264/46.4; 264/46.6; 264/DIG. 77
[58] Field of Search .............. 264/53, 46.4, 46.6, 264/46.5, DIG. 77

[56] References Cited

U.S. PATENT DOCUMENTS

| | | | |
|---|---|---|---|
| 3,505,275 | 4/1970 | Sato et al. | 260/37 |
| 3,691,265 | 9/1972 | Cobbledick | 264/45.5 |
| 3,737,400 | 6/1973 | Kumasaka et al. | 521/125 |
| 4,160,851 | 7/1979 | Lienert et al. | 427/379 |
| 4,188,457 | 2/1980 | Throp | 264/45.5 |
| 4,278,629 | 7/1981 | Bennett | 264/46.6 |
| 4,559,094 | 12/1985 | Hostetler et al. | 264/46.6 |
| 4,596,832 | 12/1986 | Ariga et al. | 264/54 |
| 4,758,294 | 7/1988 | Storch | 264/46.6 |
| 4,873,036 | 10/1989 | Urai | 264/46.4 |
| 4,908,161 | 3/1990 | Ashida | 521/123 |
| 4,913,969 | 4/1990 | Schulte et al. | 156/276 |

FOREIGN PATENT DOCUMENTS

| | | |
|---|---|---|
| 451685 | 10/1991 | European Pat. Off. . |
| 2651400 | 5/1978 | Fed. Rep. of Germany . |
| 1214478 | 12/1970 | United Kingdom . |

*Primary Examiner*—Allan R. Kuhns
*Attorney, Agent, or Firm*—Joseph C. Gil; N. Denise Brown

[57] ABSTRACT

A process for the production of composite bodies of polyurethane foams and covering layers, which includes at least partly lining a mold with a covering layer, and filling the mold with a reaction mixture which reacts to form a polyurethane foam. The reaction mixture which forms a polyurethane foam consists of a polyisocyanate component, a component consisting of at least one organic compound having at least two isocyanate reactive groups, blowing agents, and salts with water of crystallization as additives for improving the bond between the foam and the covering layer.

5 Claims, No Drawings

PROCESS FOR THE PRODUCTION OF COMPOSITE BODIES HAVING ENHANCED BONDING BETWEEN LAYERS OF THE COMPOSITE BODIES THUS OBTAINED

BACKGROUND OF THE INVENTION

The present invention relates to a new process for the production of composite bodies of polyurethane foams and covering layers, by placing a covering layer inside a mold, and filling the mold with a reaction mixture which reacts to form polyurethane foam. The invention also relates to the composite bodies produced according to this process.

The production of composite bodies by foaming polyurethane in contact with covering layers is known in principle. It is generally carried out by foam molding a reactive and foamable mixture of organic polyisocyanates, compounds containing isocyanate reactive groups and the usual auxiliary agents and additives, the covering layer having previously been placed inside the mold and suitably fixed in position, i.e. the internal wall of the mold having preferably been at least partly lined with the covering layer.

Both flexible and semi-rigid and rigid moldings may be produced by this process with the appropriate choice of the starting components. In particular, the molecular weight and functionality of the starting components should be considered.

One fundamental problem in the production of such composite bodies is the adherence between the reaction mixture which reacts to form the polyurethane foam and the covering layer. Important advances have been achieved in this respect, for example, by providing suitable bonding agents. Thus, for example, the adherence of mixtures which react to form polyurethane to metals has been substantially improved by pretreating the metal surface with aqueous polyurethane dispersions (DE-AS 2,633,764).

New problems in the adherence of the polyurethane foams to covering layers have arisen when CFC blowing agents for polyurethane foams have been replaced by water/carbon dioxide as blowing agents. The polyurethane foams thus produced adhere much less firmly to the materials conventionally used as covering layers. It has now been found that a marked improvement in the adherence of foams produced with water as a blowing agent can be achieved by the addition of salts containing water of crystallization, preferably salts which have a solubility below 5 g/l in water at 20° C.

The use of salts containing water of crystallization as additives for the production of polyurethane resins is known. However, the relevant state of the art gives no hint of the effect of these additives in improving the adherence of polyurethane foams to the covering layer. GB-PS 1,147,695 describes the use of salts containing water of crystallization for the preparation of polyurethanes which are not foamed. DE-OS 1,806,404 describes the use of salts containing water of crystallization for the production of foam molded articles which have particularly uniform properties. The same applies to DE-OS 2,651,400, which relates to the use of compounds containing water of crystalization in one-component systems. None of these references disclose any information concerning the above-identified problem of foam adherence to the covering layers.

According to an earlier proposal of our own (German Patent Application P 40 13 141.6), salts containing water of 25, crystallization are used as blowing agents for the production of molded foams having a compact surface. These products are produced without any covering layers.

DESCRIPTION OF THE INVENTION

The present invention relates to a process for the production of composite bodies of polyurethane foams and covering layers, comprising at least partly lining the inside of a mold with a covering layer, and filling the mold with a reaction mixture which reacts to form a polyurethane foam, wherein the improvement comprises a reaction mixture containing of a) a polyisocyanate component consisting of at least one aromatic polyisocyanate, b) a reactive component consisting of at least one organic compound having at least two isocyanate reactive groups, c) blowing agents, and d) from 0.1 to 15% by weight, based on the weight of component b), of salts containing water of crystallization, while maintaining an isocyanate index of from 75 to 1500.

The reaction mixtures used optionally contain other auxiliary agents and additives.

In the context of this invention, "polyurethane foams" include not only the known urethane group-containing reaction products of polyisocyanates and polyhydroxyl compounds which are in the form of foam but also other foams based on polyisocyanates, such as isocyanurate-modified polyurethane foams and polyurea foams which are free from urethane groups, which may be obtained from organic polyisocyanates and organic polyamines. The products according to the invention are, however, preferably true polyurethanes, i.e. polyurethanes containing urethane groups which are optionally isocyanurate-modified.

Polyisocyanate component a) may be any aromatic poly-isocyanates having an isocyanate content of at least 20% by weight. Examples include 2,4-diisocyanatotoluene, commercial mixtures thereof with 2,6-diisocyanatotoluene or, preferably, the known polyisocyanates or polyisocyanate mixtures of the diphenylmethane series such as are obtainable, for example, by the phosgenation of aniline/formaldehyde condensates optionally followed by distillative working up of the products of phosgenation. These polyisocyanates or polyisocyanate mixtures which are particularly suitable for the process according to the invention generally contain from 50 to 100% by weight of diisocyanatodiphenylmethane isomers, the remainder consisting substantially of higher functional homologs of these diisocyanates. The diisocyanates present in these mixtures consist substantially of 4,4'-diisocyanatodiphenylmethane mixed with up to 60% by weight, based on the total quantity of diisocyanates, of 2,4'-diisocyanatodiphenylmethane and, optionally, small quantities of 2,2'-diisocyanatodiphenyl-methane. Derivatives of these polyisocyanates modified with urethane, carbodiimide or allophanate may also be used as polyisocyanate components a).

The reactive component b) consists of at least one organic compound having at least two isocyanate reactive groups. It generally consists of mixtures of several such compounds. The individual compounds of component b) are preferably organic polyhydroxyl compounds known per se from polyurethane chemistry.

These include, in particular, the polyhydroxypolyethers known per se which have molecular weights in the range of from 400 to 10,000, preferably from 1500 to 6000, and contain at least 2, preferably 2 to 6, hydroxyl groups per molecule. Suitable polyhydroxypolyethers are obtained in known manner by the alkoxylation of suitable starter molecules such as, for example, water, propylene glycol, glycerol, trimethylolpropane, sorbitol, cane sugar, amino alcohols such as ethanolamine or diethanolamine, or aliphatic amines such as n-hexylamine or 1,6-diaminohexane, or any mixtures of such starter molecules. Suitable alkoxylating agents are, in particular, propylene oxide as well as ethylene oxide which may be used either together with propylene oxide in the alkoxylation reaction or in a separate reaction step.

The known modification products of such polyether polyors, i.e. the known graft polyethers based on the simple polyether polyols exemplified above, or the known polyether polyols which contain polyaddition products as fillers, for example, polyether polyols containing polyhydrazocarbonamides as disperse fillers, are also suitable.

The usual polyester polyols in the molecular weight range of from 400 to 10,000, preferably from 1500 to 4000, having at least 2, preferably 2 to 6 hydroxyl groups per molecule are also suitable for use as all or part of component b). Suitable polyester polyols include, for example, the known reaction products of excess quantities of polyhydric alcohols of the type already exemplified above as starter molecules with polybasic acids such as succinic acid, adipic acid, phthalic acid, tetrahydrophthalic acid or any mixtures of such acids.

Low molecular weight polyhydroxyl compounds, i.e. those in the molecular weight range of from 62 to 399, are also suitable for use as component b), or as part of component b). These include the low molecular weight, hydroxyl group-containing chain lengthening agents or cross-linking agents known per se, such as, for example, alkane polyols of the type already exemplified above as starter molecules or low molecular weight polyether polyols which are obtainable by the alkoxylation of these starter molecules.

Component b) preferably consists, as already mentioned above, of organic polyhydroxyl compounds, or mixtures of organic polyhydroxyl compounds of the type exemplified above. It may consist of mixtures of the relatively high molecular weight polyhydroxyl compounds exemplified above with the low molecular weight polyhydroxyl compounds exemplified above, or it may consist of the said low molecular weight polyhydroxyl compounds used on their own, or of the above exemplified relatively high molecular weight polyhydroxyl compounds used on their own.

The reactive component b) may also consist, at least in part, of compounds containing amino groups. These include both aminopolyethers in the molecular weight range of from 400 to 12,000, preferably from 2000 to 8000, having at least two aliphatically and/or aromatically bound primary and/or secondary amino groups, preferably primary amino groups, and low molecular weight polyamines in the molecular weight range of from 60 to 399.

The aminopolyethers include, for example, those of the type mentioned in EP-B-0,081,701, U.S. Pat. No. 3,654,370, No. 3,155,728, No. 3,236,895, No. 3,808,250, No. 3,975,428, No. 4,016,143, No. 3,865,791 and DE-OS 2,948,491. Examples of low molecular weight polyamines include aliphatic polyamines such as ethylene diamine and 1,6-diaminohexane but preferably aromatic polyamines, in particular, alkyl substituted phenylene diamines such as 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane or any mixtures of such compounds.

The blowing agents c) used in the process according to the invention are low boiling organic liquids which are free from CFC's, in particular, the isomeric butanes, pentanes and/or hexanes, but preferably water. Suitable blowing agents also include, for example, compounds which split off nitrogen, such as azodicarbonamide or azobisisobutyronitrile, compounds which split off carbon dioxide, such as pyrocarbonic acid esters and anhydrides (U.S. Pat. No. 4,070,310), and blowing agents which are dissolved in the reactants, in particular, in the component containing isocyanate reactive groups, e.g. air, may also be used.

The total quantity of blowing agents used depends, of course, on the desired density of the molded products.

It is essential for the invention to use salts containing water of crystallization as additives d) in quantities of from 0.1 to 15% by weight, preferably from 1 to 10% by weight, based on the weight of component b). These additives are preferably used in the form of powders having a maximum particle size of 300 $\mu$m, in particular 150 $\mu$m.

The term "salts containing water of crystallization" should also include oxyhydrates or hydroxides of heavy metals in the context of the present invention. Suitable salts include, for example, those salts containing water of crystallization which have a solubility in water below 5 g/l at 20° C. Such salts generally also have the necessary low solubility in the polyol mixtures used. In particular, it is preferred to use salts which are only slightly hygroscopic and which can easily be ground up into fine powders, which is an advantage for processing. The salts are preferably used in the form of powders of which at least 70% passes through a sieve with a mesh of 100 $\mu$m.

Suitable salts include, for example, the oxyhydrates or hydroxides of aluminum, barium, calcium, iron, copper or magnesium; and salts of inorganic or organic acids containing water of crystallization such as the salts of carbonic acid, hydrochloric acid, sulphuric acid, hydrofluoric acid, boric acid, oxalic acid, formic acid, acetic acid, lactic acid and benzoic acid with metals such as aluminum, barium, calcium, chromium, iron, potassium, copper, magnesium, manganese, sodium, zinc, tin and zirconium, e.g. AlKSO$_4$.12H$_2$O), Ba(OH)$_2$.8H$_2$O, BaC$_2$O$_4$.2H$_2$O, CaC$_4$H$_4$O$_6$.4H$_2$O, CaC$_2$O$_4$.H$_2$O, CaSO$_4$.2H$_2$O, CeSO$_4$.4H$_2$O, Ce(C$_2$O$_4$)$_3$.10H$_2$O, CuSO$_4$.5H$_2$O, Na$_2$B$_4$O$_7$.10H$_2$O, NH$_4$MgAsO$_4$.6H$_2$O, MgCO$_3$.3H$_2$O, KHCO$_3$.MgCO$_3$.4H$_2$O, Al$_2$O$_3$.2SiO$_2$.2H$_2$O and 4MgCO$_4$.Mg(OH)$_2$.4H$_2$O.

Particularly preferred, however, are the salts containing water of crystallization of phosphoric acid, diphosphoric acid and polymeric phosphoric acids, e.g. Mg$_3$(PO$_4$)$_2$.8H$_2$O, AlPO$_4$.3H$_2$O, CaHPO$_4$.2H$_2$O, Ca(H$_2$PO$_4$)$_2$.H$_2$O, Mg$_3$(PO$_4$)$_2$.8H$_2$O, Cu$_2$P$_2$O$_7$.3H$_2$O, FePO$_4$.2H$_2$O, Na$_2$HPO$_4$.12H$_2$O, Na$_2$HPO$_4$.2H$_2$O, Na$_2$H$_2$-

$P_2O_6 \cdot 6H_2O$, $Na_3PO_4 \cdot 12H_2O$, $Mg(H_2PO_4)_2 \cdot 4H_2O$ and $MgHPO_4 \cdot 2H_2O$ and in particular $MgNH_4PO_4 \cdot 6H_2O$. The last mentioned magnesium ammonium phosphate containing 6 mol of water of crystallization is particularly preferred.

Other auxiliary agents and additives e) optionally used in addition to the salts containing water of crystallization for this invention are known per se, for example, catalysts which accelerate the isocyanate polyaddition reaction such as tertiary amines, e.g. triethylenediamine, N,N'-dimethylbenzylamine or N,N'-dimethylcyclohexylamine, or organometallic compounds, in particular, tin compounds such as tin(II)octoate or dibutyl tin dilaurate. Trimerization catalysts such as alkali metal acetates, e.g. sodium or potassium acetate, alkali metal phenols, e.g. sodium phenolate or sodium trichlorophenolate or 2,4,6-tris-(dimethylaminomethyl)-phenol as well as lead naphthenate, lead benzoate or lead octoate may also be used according to the invention if polyurethane foams containing isocyanurate groups are to be produced.

Other auxiliary agents and additives d) optionally used also include, for example, the foam stabilizers known per se, for example those based on polyether-modified polysiloxanes.

The process according to the invention is generally carried out by first mixing the starting components b) to d), and then combining the mixture with polyisocyanate component a). The last mentioned mixing process may be carried out, for example, in mixers containing mechanical stirrers, or preferably, in the usual high pressure mixing apparatus such as those conventionally used for the preparation of polyurethane foams.

Preparation of the reaction mixture is immediately followed by filling of the mold which has been at least partly lined with a covering layer.

Suitable covering layers may be, for example, sections or films of synthetic resins such as polyester or polyepoxide resins, optionally, reinforced with glass fibers, plasticized PVC or textiles, or metals such as iron sheeting or aluminum or wood. The covering layer is frequently coated with a bonding primer on the side facing the foam. Suitable bonding agents are, for example, the optionally silane-containing polyurethane dispersions according to DE-AS 2,633,764.

The covering layer may be fitted to the surface of the mold by deep drawing with or without the assistance of a vacuum or by mechanical shaping. Alternatively, the foaming pressure of the reaction mixture may be used for shaping a film which has not been preformed.

Closed molds are generally used, and the quantity of the reaction mixture introduced into the mold is adapted to the desired gross density of the molded product. The quantity of the reaction mixture is chosen so that if left to foam without restriction, it would expand to at least 1.2 times the volume of the mold. The process according to the invention may also be carried out by the semi-prepolymer process instead of by this one-shot process. In this semi-prepolymer process, the total quantity of polyisocyanate component a) is reacted with part of component b), for example, at an NCO/OH equivalent ratio of at least 3:1, preferably at least 8:1, to produce an isocyanate prepolymer which is then reacted with a mixture of the remainder of components b) to d). The polyhydroxyl compounds b) used for the preparation of the isocyanate prepolymers may, of course, differ from the polyhydroxyl compounds b) which are subsequently mixed with the isocyanate prepolymers.

In all the variations of the process according to the invention, the quantitative ratios of the individual components are chosen so that the isocyanate index of the reaction mixture is from 75 to 1500, preferably from 100 to 150. By "isocyanate index" is meant the quotient of the number of isocyanate groups divided by the number of isocyanate reactive groups multiplied by 100. Isocyanate indexes significantly above 100 should be used if trimerization catalysts are used at the same time to produce isocyanurate-modified polyurethane foams. The water present in the salts containing water of crystallization, which are essential components for the invention, is not included in the calculation of the isocyanate index.

The gross density of the polyurethane core is at least 60 kg/m$^3$, preferably from 100 to 800 kg/m$^3$.

The temperature of the mold used is generally at least 30° C., preferably at least 50° C.

The invention is further illustrated but is not intended to be limited by the following examples in which all parts and percentages are by weight unless otherwise specified.

EXAMPLES

Starting materials

Component a):

Polyisocyanate mixture of the diphenylmethane series having an isocyanate content of 31% by weight and containing 60% by weight of isomeric diisocyanatodiphenylmethane of which 55% by weight consists of 4,4'-diisocyanatodiphenylmethane and about 5% by weight of 2,4'-diisocyanatodiphenylmethane.

Polyol component b1):

Propoxylation product of trimethylolpropane with OH number 860.

Polyol component b2):

Propoxylation product of trimethylolpropane with OH number 42.

Additive d1 (stabilizer):

Commercial polyether siloxane (((R))Tegostab OS 50, Manufacturers: Goldschmidt AG, 4300 Essen 1).

Additive d2 (catalyst):

N,N-Dimethylcyclohexylamine

The polyol mixtures shown in Table 1 are worked up with the quantity of polyisocyanate component a) also shown in Table 1.

TABLE 1

| Component (Parts by weight) | (all figures denote parts by weight) Examples | |
|---|---|---|
| | 1a-c | 2a-c |
| b1 | 60 | 60 |
| b2 | 40 | 40 |
| d1 | 1 | 1 |
| d2 | 1.5 | 1.5 |
| a | 136 | 136 |
| Water | 0.5 | 0.5 |
| Magnesium ammonium phosphate hexahydrate* | 5 | — |

*pulverulent maximum particle diameter: about 100 μm

Using the formulations shown in Table 1, plate-shaped foam products having a gross density of from 200 to 600 kg/m$^3$ were produced. The plate-shaped mold used measured 100×200×200 mm and its internal wall was coated with a commercial external mold release agent based on parafine wax dispersed in 1,1,1-trichloroethane (®Acmosil 180, Manufacturer: Acmos, D-2800 Bremen 1).

The covering layer which was to be tested was fixed to the other internal wall by adhesive tape.

Before the polyol mixtures were processed they were charged with 10% vol. (based on the atmospheric pressure) of finely dispersed air by brief high speed stirring (5 minutes, 1000 revs/min, propeller stirrer).

Preparation of the reaction mixtures from the polyol mixtures and polyisocyanate component a) was carried out in a conventional mixing apparatus equipped with mechanical stirrer. The density of each molded product was determined by the quantity of reaction mixture introduced into the mold.

Table 2 shows the forces (N) required for tearing the covering layers off the molded foams. These results were obtained by pulling the covering layers from test samples 5 cm in width at an angle of 135° C. by means of a dynamometer.

TABLE 2

| Gross density kg/m$^3$ | Examples | | | | | |
|---|---|---|---|---|---|---|
| | 1a | 2a | 1b | 2b | 1c | 2c |
| 200 | — | — | — | — | greater than 50 film breaks | 20–30 |
| 300 | 85–115 | 65–100 | 100–140 | 10–20 | — | — |
| 600 | 100–130 | 90–120 | — | — | — | — |

The stripping forces of Examples 1a–c according to the invention using salts containing water of crystallization are always higher than those of the corresponding comparison Examples 2a–c.

Examples (Table 2)

Examples 1a, 1b and 1c are prepared according to the invention using salts containing water of crystallization.

Comparison Examples 2a, 2b and 2c are prepared without the addition of salts containing water of crystallization.

In Examples 1a and 2a, the covering layer consisted of an aluminum sheet of 0.2 mm in thickness which had previously been coated on the side facing the foam with a commercial bonding agent based on a silane-containing polyurethane dispersion (RC-PUR bonding agent 550 of Rheinchemie Rheinau GmbH, 6800 Mannheim) in accordance with the teaching of DE-AS 2,633,764.

In Examples 1b and 2b, the covering layer consisted of a commercial ski laminate based on glass fiber reinforced polyepoxide (((®))Polyspeed Type 160/600 B; Danutec Werkstoff GmbH, St.Peter-Str. 25, A-4021 Linz, Austria).

In Examples 1c and 2c, the covering layer consisted of a commercial PVC film coated with a primer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of composite bodies of polyurethane foam and a covering layer, comprising at least partly lining the inside of a mold with a covering layer, and filling the mold with a reaction mixture which reacts to form a polyurethane foam, wherein the improvement comprises using a reaction mixture containing
   (a) a polyisocyanate component consisting of at least one aromatic polyisocyanate,
   (b) a reactive component consisting of at least one organic compound having at least two isocyanate reactive groups,
   (c) blowing agents, and
   (d) from 0.1% to 15% by weight, based on the weight of component b), of salts containing water of crystallization, while maintaining an isocyanate index of from 75 to 1500, thereby forming a polyurethane foam having improved adherence to said covering layer relative to a polyurethane foam produced from a reaction mixture containing no salts having water of crystallization.

2. The process of claim 1, wherein said reaction mixture also contains
   e) other auxiliary agents and additives.

3. The process of claim 1, wherein the covering layer has been pretreated with a bonding agent on the side which faces the polyurethane foam.

4. The process of claim 1, wherein
   d) said salts containing water of crystallization have a solubility in water of less than 5 g/l at 20° C.

5. The process of claim 1, wherein
   d) said salt containing water of crystallization is magnesium ammonium phosphate containing 6 mol of water of crystallization per mol of salt.

* * * * *